Aug. 14, 1928.  
J. F. CULP  
LUBRICATING SYSTEM  
Filed Feb. 4, 1926  
1,680,936
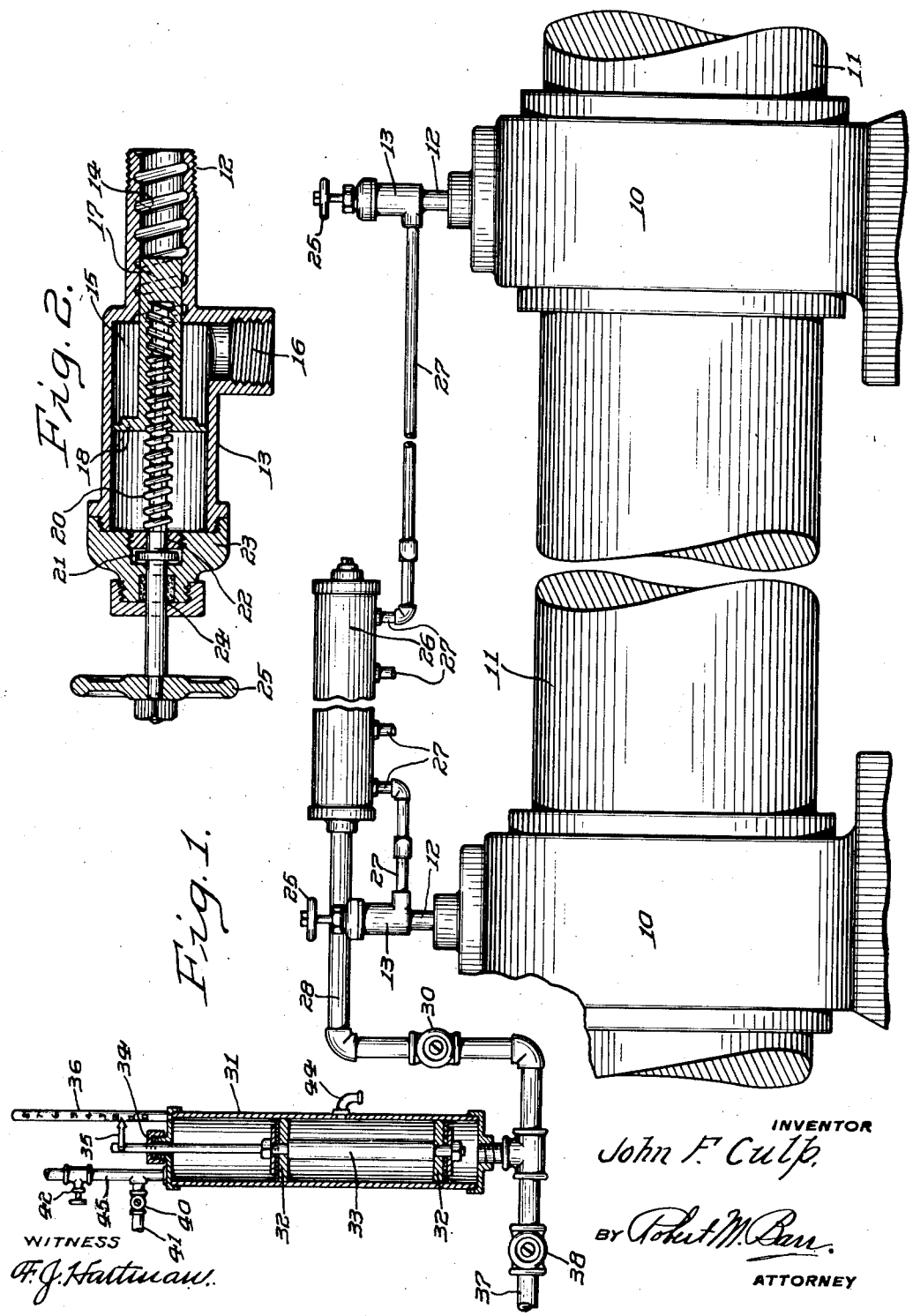
INVENTOR
John F. Culp,
BY Robert M. Barr.
ATTORNEY
WITNESS
F. J. Hartman.

Patented Aug. 14, 1928.

1,680,936

UNITED STATES PATENT OFFICE.

JOHN F. CULP, OF PHILADELPHIA, PENNSYLVANIA, ASSIGNOR TO IDEAL LUBRICATOR COMPANY, OF PHILADELPHIA, PENNSYLVANIA, A CORPORATION OF DELAWARE.

LUBRICATING SYSTEM.

Application filed February 4, 1926. Serial No. 85,948.

The present invention relates to lubricating devices and more particularly to a system for supplying lubrication from a common source to a plurality of bearings or places requiring lubrication.

Some of the objects of the present invention are to provide an improved system of lubrication by a grease or heavy viscous material; to provide means for supplying perfect lubrication for moving parts with a minimum supply of viscous lubricant; to provide means for supplying grease lubrication regulated as to the requirements of a plurality of bearings or other parts from a common source under constant pressure; to provide a grease lubricating system whereby a plurality of bearings each, for example, requiring a different amount of lubricant in a given time, are automatically fed from the same source with heavy viscous lubricant proportioned according to the separate requirements; to provide an improved supply reservoir for lubricant wherein the actuating device is maintained under constant pressure and always operative; to provide a lubricating system of great flexibility; and to provide other improvement as will hereinafter appear, In the accompanying drawings Fig. 1 represents a side elevation in part section of one form of lubricating system embodying the present invention; and Fig. 2 represents a longitudinal section of one form of control valve forming a part of the system.

Refering to the drawings one form of the present invention is shown as supplying a continuous uniform flow of lubricant of plastic or heavy viscous material such as grease to the bearings 10 of a shaft 11, such supply being automatically proportioned in accordance with the needs of the bearings. The lubricant enters the bearings 10 respectively by way of discharge pipes 12 which lead from control valves 13.

In order to regulate the supply of lubricant so that each bearing receives substantially the exact amount of lubricant necessary for the highest efficiency in operation all the valves 13 which may be used with the system have means providing for an adjustment of the lubricant flow, and as these valves are all, preferably, of like construction, this description will be confined to the details of one valve only. The discharge pipe 12 of the valve has its bore provided with a relatively long groove 14 of helical form which has its inner end in communication with the lubricant receiving chamber 15 in the body of the valve. This chamber 15 also communicates with the inlet 16 which is connected to the source of lubricant supply, and control of the flow from the inlet 16 to the outlet 12 is had only by a plunger 17 which forms the movable element of the valve. This plunger 17 is arranged for sliding fit in the bore of the discharge 12 and has a closure disc 18 slidable in the chamber 15 and seating over the inlet to the groove 14 to shut off the flow entirely if desired. Movement is transmitted to the plunger 17 by a rotatable threaded stem 20 which threads into the plunger 17 but is itself held against longitudinal movement by a collar 21 held between the end 22 of the valve 13 and a head 23 screwed on to the end of the valve 13. The stem 20 projects through a stuffing box 24 and has a hand wheel 25 for manual operation.

As a means for supplying lubricant to one or more of the valves 13, a manifold 26 is provided having outlet pipes 27 leading respectively to the several control valves, of which there are as many as there are bearings to be lubricated. This manifold 26 is maintained supplied with lubricant under constant pressure by means of a pipe 28 controlled by a hand valve 30 and in communication with a pressure reservoir 31, here shown in the form of a cylinder having a displacement member in the form of two spaced pistons 32 connected by a rod 33. One end of this rod 33 is extended to project through a stuffing box 34 where it terminates in a pointer 35 operatively located with respect to a scale 36 graduated to indicate the contents of the reservoir.

The reservoir 31 is filled by introducing lubricant under pressure by way of a pipe 37 controlled by a valve 38, and when being filled the valve 38 is open and the valve 30 is closed. Any means for introducing the lubricant under pressure into the reservoir 31 can be employed. When filling the reservoir 31 with its supply of lubricant the pressure at the opposite side of the piston 32 is relieved by opening a valve 40 in a relief pipe 41 and at the same time a valve 42 in the pressure supply pipe 43 is closed. After the lower end of the reservoir 31 is filled and the piston 32 has moved to the limit of its stroke the valves 38 and 40 are closed and the valves 30 and 42 are open so that the lubricant ejecting medium, which is preferably water under pressure, is admitted and acts upon the piston 32 to gradually force the lubricant out by way of the pipe 28 and into the manifold 26, from whence it flows to the several valves 13. To prevent the piston 32 from becoming balanced by pressure leaking past one end, an outlet 44 is provided which is open to the atmosphere, and can serve also as a drain for any water collecting between the ends of the piston 32.

By the provision of the valves 13, each of which is separately adjustable, the requirements of any bearing can be exactly met so that where one bearing requires one quantity of lubricant in a given time and another bearing a different quantity in a given time, both can be efficiently lubricated from the same source and each receive its proportioned share. Thus in one instance the plunger 17 of one valve 13 may be set to cause the lubricant to follow two complete convolutions of the groove 14 before entering the unrestricted portion of the discharge bore, and in another instance the plunger 17 of another valve 13 may be set to cause the lubricant to follow but one complete convolution of the groove 14 before entering the unrestricted portion of the discharge bore. By this arrangement the flow of lubricant can be accurately proportioned as required by varying the length of the groove 14, while at the same time subjecting the lubricant to the same constant pressure.

From the foregoing it will be apparent that a complete unitary flexible lubricating system has been provided whereby the requirements of any bearing as to lubricant can be met and when so set it will so remain and maintain a uniform predetermined flow to that bearing under normal operating conditions. Furthermore, by the system of the present invention the common source of supply will accurately supply each bearing with its predetermined proportioned amount of lubricant and the only attention necessary is the maintenance of lubricant in the main supply reservoir. It should also be noted that the main supply reservoir is provided with a movable member formed of spaced pistons whereby it is impossible for leakage to pass to the opposite side of the piston from the pressure medium to thereby build up a balancing pressure which would render the device inoperative. The system of the present invention is an open one in that the grease is discharged to bearings which have no connection with a return system, and for that reason the present system differentiates from oil supply systems having as a part a return whereby the liquid lubricant is not only continuously circulated through the bearings but would be inoperative without the provision of such closed return.

While the foregoing description has referred to water as the preferred pressure medium, it is to be understood that air, steam or any other medium under pressure can be used for providing the desired constant pressure, and that this application is not limited to that here shown.

In the foregoing the term "lubricant" has been used in the sense of a heavy non-flowing lubricant such as grease or other heavy viscous material since the carrying out and operation of the system is dependent upon a non-fluid type of lubricant.

While only a single form is shown in which this invention may be embodied, it is to be understood that the invention is not limited to any specific construction, but might be applied to various forms without departing from the spirit of the invention or the scope of the appended claims.

Having thus described my invention, I claim:

1. A grease lubricating system comprising a plurality of grease supply pipes normally open to establish communication respectively with a plurality of bearings, a valve in each supply pipe having a relatively long grease supply groove interposed between the inlet and outlet of the valve, means operable at will for varying the grease feeding length of the respective valve grooves, a grease reservoir common to said supply pipes, a plunger in said reservoir for expelling grease therefrom, and means to place said plunger under pressure to cause grease to feed continuously through said valves in quantities predeterminedly proportioned by the set groove lengths of said valves.

2. A grease lubricating system comprising a plurality of grease supply pipes normally open to establish communication respectively with a plurality of bearings, a valve in each supply pipe provided with a relatively long grease supply groove having a cross-sectional area sufficiently large to prevent clogging under any expelling pressure, means operable at will for varying the grease feeding length of the respective valve grooves, a grease reservoir common to said supply pipes, a plunger in said reservoir for expelling grease therefrom, and means to place said plunger under pressure to cause grease to feed continuously through said valves in quantities predeterminedly proportioned by the set groove lengths of said valves.

Signed at Philadelphia, in the county of Philadelphia, State of Pennsylvania, this 27th day of January, 1926.

JOHN F. CULP.